F. D. CONARD.
WASHER SECURING DEVICE.
APPLICATION FILED MAY 10, 1920.
1,376,744.
Patented May 3, 1921.
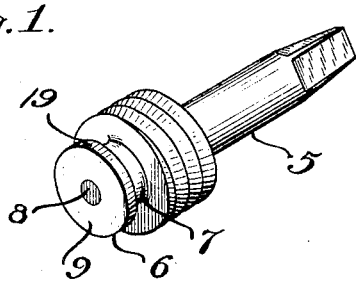
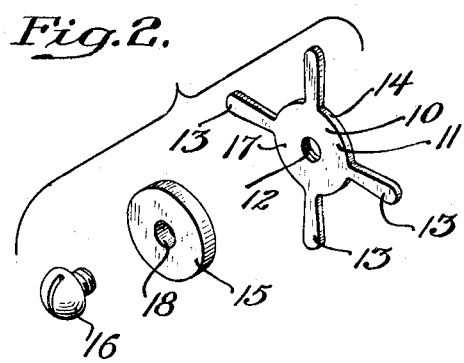 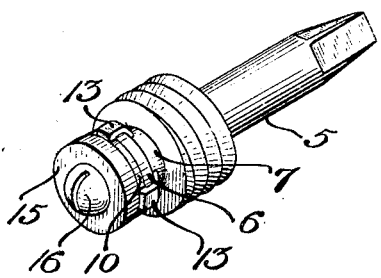
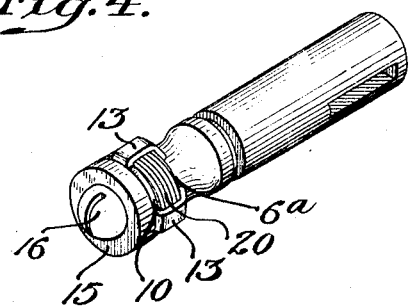
Witnesses.
Evelyn Crompton
Augustus B. Coppus
Inventor.
Frederick D. Conard
by Joshua R. H. Potts
his Attorney.

UNITED STATES PATENT OFFICE.

FREDERICK D. CONARD, OF PHILADELPHIA, PENNSYLVANIA.

WASHER-SECURING DEVICE.

1,376,744.     Specification of Letters Patent.     Patented May 3, 1921.

Application filed May 10, 1920. Serial No. 380,228.

*To all whom it may concern:*

Be it known that I, FREDERICK D. CONARD, a citizen of the United States, residing at Philadelphia, in the county of Philadelphia and State of Pennsylvania, have invented certain new and useful Improvements in Washer-Securing Devices, of which the following is a specification.

It often occurs that when a plumber is called in to repair a valve in a faucet or other apparatus that he finds that the screw which is usually employed to secure the washer to the valve stem has become corroded and either is broken off or breaks off within the valve stem when the plumber attempts to remove the screw. It is then impossible to insert a new screw until the broken portion of the screw within the valve stem is removed and this latter mentioned operation necessitates that the broken part be drilled out and the hole very often requires to be re-tapped. It is often necessary, unless the plumber goes fully prepared with tools for this latter purpose, to take the valve stem back to the shop for the purpose of removing the broken part from the valve stem and preparing the same for the insertion of a new screw. This takes considerable time and it is quite expensive to the person having the repair made.

The main object of the present invention is to provide means which can be used to quickly attach a washer to a valve stem without requiring the drilling of any broken portion of the screw from the valve stem if the screw is broken off during the attempted removal of the screw from said valve stem. It will be understood, however, that the device is also applicable for securing washers to valve stems of various shapes even though the latter do not have screwed connections for the washers since my improved washer-attaching device can be secured to practically any valve stem which provides a free end for engagement with certain portions of the device which will hereinafter be described.

Another object is to make my invention of a simple construction and so that it can be easily and cheaply manufactured.

These objects, and other advantageous ends which will be described hereinafter, I attain in the following manner, reference being had to the accompanying drawings in which—

Figure 1 is a perspective view of a valve stem, such for example as a valve stem employed in an ordinary house faucet, and showing the same with a screw having broken off, which screw previously served to secure a washer thereto, Fig. 2 is a detached perspective view showing my improved securing device and an ordinary washer and screw, Fig. 3 is a perspective view showing the valve stem of Fig. 1 having a washer secured thereto by the device of my invention, and Fig. 4 shows another form of valve stem, such for example as a valve stem employed in a toilet flush tank, and which has a washer secured thereto by my improved device.

Referring particularly to Figs. 1 to 3 inclusive, 5 represents a valve stem of a well known construction having a head 6 and a neck 7 immediately to the rear of the head 6. A broken portion 8 of a screw which, for example, previously secured a washer to the head 6 is illustrated; the same having been filed flush with the outer surface 9 of the head 6. My improved securing device 10 is shown in its normal state in Fig. 2 and includes a central ring portion 11 which has a central screw threaded hole 12. A number of fingers 13 are formed integral with the central ring portion 11 and project preferably radial from the peripheral surface 14 of said ring portion 11. This device 10 may be made by stamping the same out of flexible sheet metal; sufficient thickness being given to the central portion 11 to provide at least two screw threads in the hole 12. An ordinary washer 15 and a short stem screw 16 is provided and the washer can be secured against the forward face 17 of the central ring portion 11, and the shank of the screw 16 can be projected through the hole 18 of the washer so as to engage the screw threaded hole 12 and thereby securely fasten the washer to said central ring portion 11. The opposite face of the central ring portion 11 of the device 10 can be placed against the surface 9 of the head 6 of the valve stem 5 and the fingers 13 can be bent around the peripheral edge 19 of the head 6 so as to engage back of said head and thereby securely hold the device 10 to the valve stem as clearly shown in Fig. 3. The valve stem is then ready for use in connection with a faucet or other place for which it is intended.

In Fig. 4 I have shown my improved device serving to secure a washer to a valve stem of a slightly different type, such for example as the valve stem employed in the flush tank of a toilet; said valve stem previously having had a portion (not shown) which was screwed to the valve stem and I have illustrated screw threads 20 previously employed on the head $C^a$ for the purpose of securing the washer. Thus it is obvious that my invention is applicable for securing a washer to the heads of valve stems even though the means of connection previously employed differ from the type of connection for example as shown by the type of valve stem illustrated in Figs. 1 and 3.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A washer-securing device for valve stems including a central portion provided with a tapped hole and having flexible fingers projecting from the peripheral edge of said central portion and adapted to be bent into embracing position with the head of a valve stem; substantially as described.

2. A washer-securing device for valve stems made from flexible sheet material and including flexible fingers adapted to be bent into embracing position with the head of a valve stem; substantially as described.

In testimony whereof I have signed my name to this specification in the presence of two subscribing witnesses.

FREDERICK D. CONARD.

Witnesses:
 ELIZABETH GARBER,
 CHAS. E. POTTS,